(12) United States Patent
Kempter et al.

(10) Patent No.: US 7,686,883 B2
(45) Date of Patent: Mar. 30, 2010

(54) C.I. PIGMENT BLUE 80-BASED BLUE DYE

(75) Inventors: Peter Kempter, Bad Soden (DE); Sven Antes, Hattersheim (DE); Herbert Graf, Rodgau (DE); Magali Meder, Grenzach-Wyhlen (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 152 days.

(21) Appl. No.: 11/921,550

(22) PCT Filed: Apr. 29, 2006

(86) PCT No.: PCT/EP2006/004055

§ 371 (c)(1),
(2), (4) Date: Apr. 9, 2008

(87) PCT Pub. No.: WO2006/128539

PCT Pub. Date: Dec. 7, 2006

(65) Prior Publication Data

US 2009/0121202 A1    May 14, 2009

(30) Foreign Application Priority Data

May 31, 2005   (DE) ................. 10 2005 024 722

(51) Int. Cl.
- C09B 67/22 (2006.01)
- C09B 67/20 (2006.01)
- C09D 5/00 (2006.01)
- C09D 11/00 (2006.01)

(52) U.S. Cl. .................. 106/498; 106/31.77; 106/493; 106/494; 430/7; 430/105; 430/108.2; 524/90

(58) Field of Classification Search ............. 106/31.77, 106/493, 494, 498; 430/7, 105, 108.2; 524/90
See application file for complete search history.

(56) References Cited

U.S. PATENT DOCUMENTS 5,318,627 A    6/1994   Dietz et al.

(Continued)

FOREIGN PATENT DOCUMENTS

| DE | 4442291 | 6/1995 |
|---|---|---|
| EP | 0504923 | 9/1992 |
| EP | 1046680 | 10/2000 |
| EP | 1046681 | 10/2000 |
| EP | 1120420 | 8/2001 |
| WO | WO 02/053654 | 7/2002 |
| WO | WO 2004050770 | 6/2004 |

OTHER PUBLICATIONS

PCT Search Report for PCT/EP 2006/004055 mailed Dec. 8, 2006.
English Translation of PCT IPER for PCT/EP 2006/004055, mailed May 22, 2008.

Database WPI Week 200522 Derwent Publications Ltd. London, GB; AN 200-204847, XP 002408997 and JP 2005-049636, (Feb. 24, 2005).

Primary Examiner—Anthony J Green
(74) Attorney, Agent, or Firm—Anthony A. Bisulca

(57) ABSTRACT

A pigment preparation which is characterized by a content in
a) a benzimidazolonedioxazine compound of formula (I) as base pigment

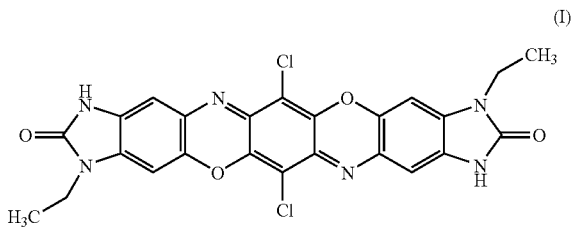

and
b) a dioxazine compound of the general formula (IV) as pigment dispersant

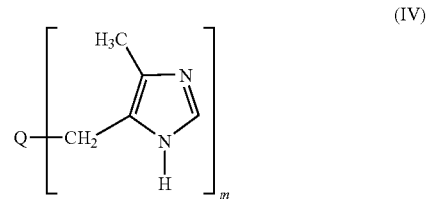

wherein
Q represents an m-valent radical of a compound of formula (III),

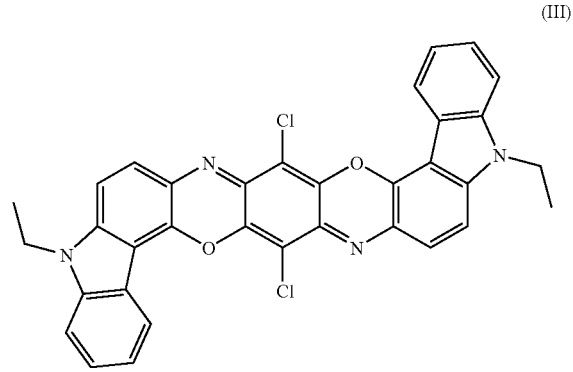

wherein m is a number from 1 to 4.

14 Claims, No Drawings

U.S. PATENT DOCUMENTS

| | | |
|---|---|---|
| 5,565,563 A | 10/1996 | Kaul et al. |
| 6,620,931 B2 * | 9/2003 | Schmidt et al. ............... 544/74 |
| 6,762,299 B2 * | 7/2004 | Schmidt et al. ............... 544/74 |
| 7,198,667 B2 | 4/2007 | Klopp et al. |
| 2006/0112852 A1 | 6/2006 | Klopp et al. |

* cited by examiner

C.I. PIGMENT BLUE 80-BASED BLUE DYE

The present invention provides pigment preparation based on benzimidazolonedioxazine pigment (C.I. Pigment Blue 80) and a specific dispersant based on a substituted Pigment Violet 23.

The pigment preparation of the present invention can be used in high-polarity, aqueous, polyurethane-based coatings and also in low-solvent high-solids acrylic resin coatings. Also useful are coating systems based on alkyd-melamine resin varnishes and two-component coatings based on polyisocyanate-crosslinkable acrylic resins. Further fields of application are effect coatings in the automotive sector, industrial coatings, in particular color filters, ink jet inks, electrophotographic toners and developers, and e-inks.

Pigment preparations are combinations of base pigments and pigment dispersants, i.e., pigments substituted with groups having specific activity. Pigment dispersants are added to pigments in order to facilitate dispersion of the latter in the application media, in particular for coatings, printing inks and color filters and in order to improve the rheological and coloristic properties of the pigments. The viscosity of high-pigmentation color concentrates (millbases) is lowered and flocculation of the pigmentary particles is reduced. Color strength, transparency and gloss for example can be enhanced as a result. This is desirable for metallic paint systems and color filters in particular.

With color filters a full-color image is produced by red, green, and blue picture elements using transmitted light. As well as the transmissive (or nonemissive) color filters (i.e., those using transmitted light) there are also reflective color filters, which are then able to work where appropriate with yellow, cyan, and magenta pixels as well.

Among the color filters a distinction is made between AM (active matrix) and PM (passive matrix) LCD (liquid crystal display) color filters, with the TFT (thin film transistor) LCD color filters being accorded a particular significance.

Color filters can also be employed, furthermore, with MEMS (DMD) (micro-electromechanical systems, digital micro mirror devices), with e-paper, and also with further suitable display technologies.

Color filter displays find application in a very wide variety of electrooptical systems, as for example in screens of desktop monitors, in computer screens, screens of portable computers (laptops), PDAs (personal digital assistants), and also in cellphone monitors, video camera monitors, GPS (global positioning systems) monitors, and other monitors, and additionally, generally, in liquid-crystal devices and charge-coupled devices, in plasma displays or in electroluminescent and other displays. The last-mentioned displays may be, for example, active (twisted nematic) or passive (supertwisted nematic) ferroelectric displays, or light-emitting diodes, for example.

Color filters find use, moreover, in flat panel displays (flat screens), which are increasingly replacing the conventional cathode ray television screens, or which may be utilized, generally, as display panels in any desired size for fixed and moving information.

A typical LCD color filter construction may be described schematically as follows: between two glass plates there is located a thin layer with liquid crystals. Besides a number of other functional components, the upper glass plate has on its outer surface the corresponding pixels, e.g., red, green, and blue (R, G, B). These pixels are outlined in black for better contrast; to the outside, the R, G, B pixels are protected by a suitable protective coat against environmental effects, such as scratches. The lower glass plate also contains further functional components such as, for example, ITO (indium tin oxide) and TFT (thin film transistors), which serve among other things to drive the individual pixels.

If suitable light (e.g., linearly polarized light of a defined wavelength) is passed through the lower glass plate, the liquid crystal can then be driven electronically and thereby set to "light" or "dark" (or to any stage in between).

Correspondingly, the color filter pixels are supplied with light and a corresponding colored image, fixed or moving, based on R, G, B, is produced to the human eye. Among color filter materials, the colorants used have to meet very particular requirements.

The most important technical parameters which have to be met are as follows:

high thermal stability: during the manufacturing process of a color filter, the individual layers applied are heated, so that the pigment preparation has to withstand temperatures of up to 300° C. for up to 1 hour;

ready dispersibility in color filter systems;

steep and narrow absorption bands for each of the color filter layers applied;

high contrast;

good and stable viscosity in the color filter medium: too high a viscosity prevents the liquid being distributed uniformly on the glass substrate and as a result impairs the quality of the picture;

ecotoxicological benignancy in processing;

nonflocculating behavior;

a very smooth (not rough) surface for the applied (pigmented) color filters;

acid resistance (for etching processes, for example);

solvent fastness.

Existing pigments and pigment preparations do not always meet all technical requirements. Particularly with regard to blue pigments there is a need for improvements with regard to color strength, hue cleanness, transparency, rheology and gloss.

The present invention has for its purpose to provide a high-transparency colorant having a reddish blue hue particularly for use of effect coatings in automotive construction and also industrial coatings, color filters, ink jet inks, electrophotographic toners and developers and e-inks.

We have found that, surprisingly, this object is achieved by the following pigment preparation.

The present invention accordingly provides a pigment preparation comprising a) a benzimidazolonedioxazine compound of formula (I) as base pigment

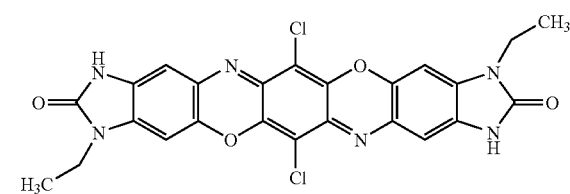

(I)

and b) a dioxazine compound of the general formula (IV) as pigment dispersant

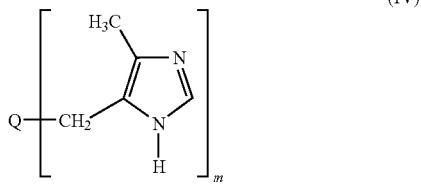

where

Q represents an m-valent radical of a compound of formula (III),

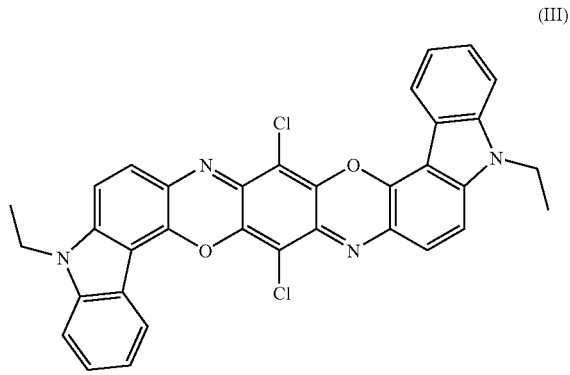

m represents a number from 1 to 4, preferably 1 to 3 and particularly 1 to 2.

The pigment preparation of the present invention contains advantageously 0.5% to 99% by weight, preferably 1% to 75% by weight, especially 2.5% to 50% by weight and most preferably 5% to 30% by weight of pigment dispersant of formula (IV), based on the weight of the base pigment of formula (I).

The pigment of formula (I) is known as C.I. Pigment Blue 80 (DE-A-44 42 291). The compound of formula (IV) is known from EP-0 504 923 B1.

The present invention also provides a process for manufacturing a pigment preparation of the present invention, which comprises the pigment dispersant of formula (IV) and the benzimidazolonedioxazine compound of formula (I) being mixed with each other or being allowed to act on each other at any stage of their manufacturing operation The pigment preparation is preferably produced by grinding the components in dry form, in moist form or in suspension.

It is further a preferred manufacturing process to add the pigment dispersant to the benzimidazolonedioxazine pigment during grinding or immediately before a finishing operation.

A third version is to mix in dry form prior to pulverization.

For example, the dry components can be mixed in pellet or powder form before or after grinding; one component can be added to the other in moist or dry form, for example by mixing the components in the form of moist presscakes.

Mixing can be accomplished for example by grinding in dry form, in moist form, for example by kneading, or in suspension, or by a combination of these methods. Grinding may be carried out in the presence of water, solvents, alkalis or grinding assistants such as salt. It is particularly preferred to bead grind at a pH between 7.0 and 12.0.

The as-synthesized benzimidazolonedioxazine crude pigment, which is typically generated in a coarsely crystalline form, is comminuted, for example by dry or wet grinding. The finely crystalline benzimidazolonedioxazines formed in the process are subjected to an aftertreatment, generally referred to as a finishing operation, for example in water and/or solvents and usually under elevated temperature, for example up to 200° C., and, if appropriate, superatmospheric pressure. It will be appreciated that the pigment dispersant can also be added in portions at different times.

The pigment preparation of the present invention can be used as a preferably aqueous presscake or moist pellet, but generally it will be in the form of solid systems of free-flowing, pulverulent constitution or in the form of pellets.

Familiar drying assemblies can be used for drying a moist pigment preparation, such as drying cabinets, paddle-wheel dryers, tumble dryers, contact dryers and, in particular, spin flash dryers and spray dryers. The choice of a suitable drying assembly makes it possible to produce low-dust and free-flowing powders or pellets.

The pigment preparations of the present invention, as well as the benzimidazolonedioxazine pigment and the pigment dispersant, may contain still further customary auxiliaries or adjuvants, for example surfactants, pigmentary and nonpigmentary dispersants, fillers, standardizers, resins, waxes, defoamers, antidusters, extenders, antistats, shading colorants, for example P.V. 23, preservatives, drying retarders, rheology control additives, wetting agents, antioxidants, biocides, UV-absorbers and photostabilizers, preferably in an amount of 0.1 to 60% by weight, particularly 0.5% to 35% by weight, based on the total weight of the pigment preparation.

Useful surfactants include anionic or anion-active, cationic or cation-active and nonionic or amphoteric substances or mixtures thereof.

Examples of suitable anionic substances include fatty acid taurides, fatty acid N-methyltaurides, fatty acid isethionates, alkylphenylsulfonates, an example being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethylaminopropylamine and p-phenylenediamine. Preference is given to condensation products based on cyanuric chloride, taurine, N,N'-diethylaminopropylamine and p-phenylenediamine.

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkylamines, cycloalkylamines or cyclized alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg of KOH per g of the polyaminoamido or polyamino compound, and salts of these cationic substances, such as acetates or chlorides, for example.

Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

By nonpigmentary dispersants are meant substances which structurally are not derived from organic pigments. They are added as dispersants either during the actual preparation of pigments, but often, also, during the incorporation of the pigments into the application media that are to be colored: for example, during the preparation of varnishes or printing inks, by dispersing the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxyl, amino, imino and ammonium groups, carboxylic acid and carboxylate groups, sulfonic acid and sulfonate groups or phosphonic acid and phosphonate groups, and may also have been modified with aromatic, nonpigmentary substances. Nonpigmentary dispersants may additionally also be aromatic substances modified chemically with functional groups and not derived from organic pigments. Nonpigmentary dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, dispersants with a comblike structure comprising polyesters and acrylic polymers, phosphoric esters, triazine-derived polymers, modified polyethers, or dispersants derived from aromatic, nonpigmentary substances. These parent structures are in many cases modified further, by means for example of chemical reaction with further substances carrying functional groups, or by means of salt formation.

Anionic groups of the nonpigmentary and pigmentary dispersants, surfactants or resins used as auxiliaries may also be laked, using for example Ca, Mg, Ba, Sr, Mn or Al ions or using quaternary ammonium ions.

By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the pulverization of the dried pigment preparation.

The present invention also provides for the use of the pigment preparation of the present invention for pigmenting macromolecular organic materials, for example plastics, resins, coatings, including powder coatings, paints, electret materials, printing inks and seed, but in particular for effect coatings, automotive coatings, industrial coatings, color filters, ink jet inks, electrophotographic toners and developers and e-inks.

High molecular mass organic materials which can be pigmented with the pigment preparation of the invention are, for example, cellulose compounds, such as, for example, cellulose ethers and cellulose esters, such as ethylcellulose, nitrocellulose, cellulose acetates or cellulose butyrates, natural binders, such as, for example, fatty acids, fatty oils, resins and their conversion products or synthetic resins, such as polycondensates, polyadducts, addition polymers and copolymers, such as, for example, amino resins, especially urea and melamine formaldehyde resins, alkyd resins, acrylic resins, phenoplasts and phenolic resins, such as novolaks or resols, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and copolymers thereof, such as polyacrylic esters or polyacrylonitriles, polyamides, polyesters, polyurethanes, coumarone-indene and hydrocarbon resins, epoxy resins, unsaturated synthetic resins (polyesters, acrylates) with the different cure mechanisms, waxes, aldehyde and ketone resins, gum, rubber and its derivatives and latices, casein, silicones and silicone resins; individually or in mixtures.

It is unimportant whether the aforementioned high molecular mass organic compounds are present in the form of plastic masses or melts or in the form of spinning solutions, dispersions, varnishes, paints or printing inks. Depending on the intended use it proves advantageous to utilize the pigment preparations of the invention in the form of a blend or in the form of prepared products or dispersions.

The present invention accordingly also provides a macromolecular organic material containing a coloristically effective amount of a pigment preparation of the present invention.

Based on the macromolecular organic material to be pigmented, the pigment preparation of the present invention is usually used in an amount of 0.01% to 30% by weight and preferably 0.1% to 15% by weight.

The reddish blue hues provided by the pigment preparations of the present invention are particularly useful for the color filter color set red-green-blue (R, G, B). These three colors are present as separate color dots alongside one another, and when backlit produce a full-color picture.

Typical colorants for the red color dot are pyrrolopyrrole, quinacridone and azo pigments, such as P.R. 254, P.R. 209, P.R. 175 and P.O. 38, for example, individually or mixed. For the green color dot, phthalocyanine colorants are typically employed, such as P.G. 36 and P.G. 7, for example.

When required, the respective color dots can also be admixed with further shading color. The red and green hue is preferably provided by admixing with yellow, for example with P.Y. 138, 139, 150, 151, 180 and 213.

The pigment preparation of the invention is notable for their outstanding coloristic and rheological properties, particularly their high flocculation stability, ready dispersibility, good rheology, high color strength, transparency, and saturation (chroma). In numerous application media they can be dispersed easily and up to high finenesses. Other properties too, such as gloss, fastness to overcoating, solvent fastness, acid fastness, light and weather fastnesses, and high cleanness of hue, for example, are very good. The pigment preparations of the present invention can also be used to obtain hues in the reddish blue region which are in demand for use in color filters. There they ensure high contrast and also satisfy the other requirements imposed in the case of use in color filters, such as high thermal stability or steep and narrow absorption bands. They can be produced to high purity and low ion contents.

The color filters can be produced by customary methods:

The pigment preparation of the present invention is dispersed in an aqueous nonaqueous system which may contain still further components, for example binders. Binders can be thermoplastic, thermoset or photosensitive. Examples of thermoplastic and thermoset binders include acrylates, acrylic esters, polyimides, polyvinyl alcohols, epoxides, polyesters, melamines, gelatin, caseins. Photosensitive binders are known per se. The color filter paste thus produced has a pigment preparation concentration of 2.5% to 80% by weight.

These dispersions (color filter pastes) can then be applied by means of spin coating or suitable conventional printing techniques (for example flexographic, offset, screen, intaglio and stamp printing) or contactless printing techniques (for example ink jet) to the color filter support material, typically a glass plate.

The pixels can also be produced by thermal sublimation, thermal transfer, electrodeposition or other suitable application techniques.

The typical use concentration for the pigment preparations of the present invention in the applied color filter film is between 5% and 95% by weight, preferably between 20% and 80% by weight and most preferably between 40% and 60% by weight, based on the total weight of the color filter film.

The technique most frequently employed is that of spin coating. In this technique, the pixels, for example R, G, B, are applied in succession in suitable photoresist systems.

An applied photoresist layer is for example exposed to radiation and subsequently developed, so that only individual pixels of the colored layer remain behind.

This process is then repeated for further colors, so that finally R, G, B or Y, M, C pixels of equal size stand alongside one another.

For most application processes, for example photolithography (photoresist technology), solvents, preferably organic solvents, are a necessary constituent. Suitable in principle is any polar or apolar organic solvent which, depending on the application process, has to meet still further properties such as water compatibility or incompatibility, thermal stability or safety- and ecotox-relevant aspects. Customary solvents are ethylcellosolve acetate, diethylene glycol alkyl ethers (for example diethylene glycol monoethyl ether, diethylene glycol dimethyl ether), propylene glycol alkyl ether acetates (for example propylene glycol monomethyl ether acetate), ethylene glycol alkyl ether acetates (for example ethylene glycol monoethyl ether acetate), N-methylpyrrolidone, ketones (for example methyl ethyl ketones, cyclohexanone and cyclopentanone), alcohols, aromatic hydrocarbons, esters (for example ethyl 3-ethoxypropionate), cyclic esters.

These solvents can be used individually or combined with each or one another. The pigment preparations of the present invention are also suitable for use as colorants in electrophotographic toners and developers, such as, for example, one- or two-component powder toners (also called one- or two-component developers), magnetic toners, liquid toners, latex toners, polymerization toners, and specialty toners.

Toner particles may also be used for cosmetic and pharmaceutical applications, for example for coating tablets. Typical toner binders are addition-polymerization resins, polyaddition resins and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

Electrophotographic toners or developers comprise a typical toner binder and between 0.1% and 80%, preferably between 1% and 40%, and more preferably between 3% and 20% by weight of a pigment preparation of the invention, and between 0% and 20%, preferably between 0.1% and 5% by weight, based in each case on the total weight of the toner or developer, of a charge control agent from the class of triphenylmethanes, ammonium compounds and immonium compounds; fluorinated ammonium and immonium compounds; biscationic acid amides; polymeric ammonium compounds; diallylammonium compounds, aryl sulfide derivatives, phenolic derivatives, phosphonium compounds, and fluorinated phosphonium compounds; calix(n)arenes; cyclodextrins; polyester salts; metal complex compounds; cyclooligosaccharide-boron complexes, interpolyelectrolyte complexes; benzimidazolones; azines, thiazines or oxazines.

In addition it is also possible for electrophotographic toners to contain waxes as well. Furthermore, waxes can also be used as a predispersed concentrate, it being possible for the concentrates (masterbatches) to be multi-component: components are the colorants of the invention, resins, charge control agents, and combinations thereof.

The pigment preparations of the invention are suitable for use, moreover, as colorants in ink-jet inks on both an aqueous and a nonaqueous basis, in microemulsion inks, and also in those inks which operate by the hot-melt method. Ink-jet inks generally contain a total of 0.5% to 25%, preferably 1.5% to 8% by weight (calculated on a dry basis) of a pigment preparation of the invention. Microemulsion inks are based on organic solvents, water, and, if desired, an additional hydrotropic substance (interface mediator).

Microemulsion inks generally contain 0.5% to 15% by weight, preferably 1.5% to 8% by weight, of a pigment preparation of the invention, 5% to 99% by weight of water, and 0.5% to 94.5% by weight of organic solvent and/or hydrotropic compound.

"Solvent-based" ink-jet inks contain preferably 0.5% to 15% by weight of a pigment preparation of the invention and 85% to 99.5% by weight of organic solvent and/or hydrotropic compounds.

Hot-melt inks are based mostly on waxes, fatty acids, fatty alcohols or sulfonamides which are solid at room temperature and liquefy on heating, the preferred melting range being situated at between about 60° C. and about 140° C. Hot-melt ink-jet inks are composed, for example, essentially of 20% to 90% by weight of wax and 1% to 10% by weight of a pigment preparation of the invention. Additionally present may be 0% to 20% by weight of an additional polymer (as "dye dissolver"), 0% to 5% by weight of dispersing assistant, 0% to 20% by weight of viscosity modifier, 0% to 20% by weight of plasticizer, 0% to 10% by weight of tack additive, 0% to 10% by weight of transparency stabilizer (which prevents crystallization of the waxes, for example), and 0% to 2% by weight of antioxidant. In addition the pigment preparations of the invention are also suitable for use as colorants for electronic inks ("e-inks") or electronic paper ("e-paper").

The majority of current automotive coatings are so-called effect coatings. This effect is provided by platelet-shaped metallic or mineral pigments, and is notable for a lightness or color impression dependent on the viewing angle. To combine ordinary pigments with such "effect pigments" it is sensible to select such organic pigments as do not disrupt the metallic effect. Pigments primarily suitable for this purpose are therefore transparent pigments, which scatter light only minimally. The greater the transparency of the organic pigment, the greater the angle-dependent effect of the effect pigments in a coating.

Since metallic pastel hues are becoming more and more popular and strongly absorbing pigments, such as carbon black, blue, violet and green for example, likewise attenuate the metallic effect, they are often used in low concentration. Preference is therefore given to such organic pigments as have—even in low concentrations—an excellent weathering fastness and a sufficiently high color strength to make a color contribution to add to the metallic effect. This requirement of organic pigments—high color strength combined with high weathering fastness at low use concentration—greatly restricts the choice of suitable pigments, which in commercial practice leads to compromises in the effect strength or in the formulation of pastel hues.

The blue pigment preparation of the present invention meets all these requirements in an almost ideal way: it is transparent, extremely strong in color and yet highly fast to weathering at very low concentrations.

The particle size distribution of the pigment preparation of the present invention is very narrow banded, which is an important criterion for use in color filters. A measure of the narrow-bandedness of the particle size distribution is provided by the characteristic values $d_{25}$, $d_{50}$ and $d_{95}$, which should be very close to one another. Preference for the purposes of the present invention is given to pigment preparations where $d_{95}$ is less than 200 nm, in particular less than 100 nm, $d_{50}$ is less than 100 nm, in particular less than 50 nm, and $d_{25}$ is less than 80 nm, in particular less than 45 nm.

To obtain particularly narrow-banded particle size distributions, for example $d_{95}$ less than 60 nm and $d_{25}$ less than 30 nm, the above-described wet-grinding operation in a bead mill can be combined with a preceding grinding operation, which is preferably a dry-grinding operation, for example in a swing mill.

The blue pigment preparation of the present invention can be used individually or in combination with suitable organic or inorganic pigments, or in combination with dyes, specifically as a mixture in the dispersion (color filter paste). The pigment preparations either serve as shading colorants, which can be added in amounts of 1% by weight to 49% by weight, as in the case of shading Pigment Blue 15 for example, or else the pigment preparations are the main components. Suitable organic pigments include in principle all monoazo, disazo, laked azo, β-naphthol, Naphthol AS, benzimidazolone, disazocondensation, and azo metal complex pigments and polycyclic pigments such as, for example, phthalocyanine, quinacridone, perylene, perinone, thioindigo, anthranthrone, anthraquinone, flavanthrone, indanthrone, isoviolanthrone, pyranthrone, dioxazine, quinophthalone, isoindolinone, isoindoline, and diketopyrrolopyrrole pigments or carbon blacks.

Also suitable in particular are surface-modified pigments whose surface has been modified by chemical operations such as, for example, sulfonation or diazotization and has been provided with functional, neutral or charge-carrying groups or polymer chains (these pigments also being referred to as self-dispersing or graft pigments).

Examples of suitable inorganic pigments include titanium dioxides, zinc sulfides, iron oxides, chromium oxides, ultramarine, nickel or chromium antimony titanium oxides, cobalt oxides, and bismuth vanadates.

Suitable organic dyes include, preferably, solvent-soluble dyes, such as solvent dyes and fatty dyes, but also acid dyes, direct dyes, sulfur dyes and their leuco form, metal complex dyes or reactive dyes; in the case of reactive dyes, dyes which have been reacted with nucleophiles can be used as well.

An exemplary selection of particularly preferred organic pigments includes carbon black pigments, such as gas blacks or furnace blacks, for example; monoazo and disazo pigments, in particular the Colour Index pigments, individually or in combination, such as, for example:

Pigment Red 2, Pigment Red 3, Pigment Red 4, Pigment Red 5, Pigment Red 9, Pigment Red 12, Pigment Red 14, Pigment Red 38, Pigment Red 48:2, Pigment Red 48:3, Pigment Red 48:4, Pigment Red 53:1, Pigment Red 57:1, Pigment Red 112, Pigment Red 122, Pigment Red 144, Pigment Red 146, Pigment Red 147, Pigment Red 149, Pigment Red 168, Pigment Red 169, Pigment Red 170, Pigment Red 175, Pigment Red 176, Pigment Red 177, Pigment Red 179, Pigment Red 181, Pigment Red 184, Pigment Red 185, Pigment Red 187, Pigment Red 188, Pigment Red 207, Pigment Red 208, Pigment Red 209, Pigment Red 210, Pigment Red 214, Pigment Red 242, Pigment Red 247, Pigment Red 253, Pigment Red 254, Pigment Red 256, Pigment Red 257, Pigment Red 262, Pigment Red 263, Pigment Red 266, Pigment Red 269, Pigment Red 274, Pigment Violet 19 or Pigment Violet 37, Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196, Pigment Yellow 213, Pigment Yellow 214;

Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 72 or Pigment Orange 74; Pigment Green 7 or Pigment Green 36 Pigment Blue 15, Pigment Blue 15:1, Pigment Blue 15:2, Pigment Blue 15:3, Pigment Blue 15:4, Pigment Blue 15:6, Pigment Blue 16, Pigment Blue 56, Pigment Blue 60 or Pigment Blue 61.

The pigment preparations of the present invention are preferably used for shading green, blue and red pigments.

Particular preference is given to combinations of the pigment preparation of the present invention with C.I. Pigment Blue 15:6 and/or with C.I. Pigment Violet 23.

The pigment preparation of the present invention is very transparent, has excellent fastness to weathering even in low concentrations, and has a sufficiently high color strength.

To assess the properties of the pigments in the paint sector, in water-free, solvent-based varnish systems, an alkyd-melamine resin varnish based on a medium-oil alkyd resin and a butanol-etherified melamine resin (AM) and a high-solids acrylic resin baking finish based on a nonaqueous suspension (HSS) and also a high-polarity, aqueous polyurethane varnish (WBC) were selected from the multiplicity of existing coatings.

The coloristic properties were determined in accordance with DIN 55986. Millbase rheology after dispersion was visually rated on the following five-point scale:

5 thin
4 fluid
3 thick
2 slightly set
1 set

Viscosity was determined, following dilution of the millbase to the final pigment concentration, using a Rossmann viscospatula type 301 from Erichsen.

In the examples which follow, parts are by weight.

COMPARATIVE EXAMPLE A

A stirred vessel is charged with 400 parts of crude pigment (Pigment Blue 80) in 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20° C. for a residence time of 20 minutes.

To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.0 parts of pigment. The pigment preparation is pin milled to obtain a highly crystalline powder which, on testing in AM varnish, produces very dull coatings which are very weak in color. The rheology of the paint is rated 5.

COMPARATIVE EXAMPLE B

A stirred vessel is charged with 348 parts of crude pigment (Pigment Blue 80), 52 parts of a pigment dispersant (JP 2005 049 636 A, compound A-48) and 20 parts of 10% NaOH in altogether 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20 to 50° C. for a residence time of 15 minutes.

To 150 parts of the mill suspension are added 124 parts of isobutanol. After several hours of stirring at boiling temperature, the alcohol is removed by steam distillation, the suspension is filtered with suction, and the presscake is washed and dried at 80° C. to give 14.6 parts of pigment preparation. The pigment preparation is pin milled to obtain a highly crystalline powder which, on testing in HSS varnish, provides coatings having extremely high hiding properties in the masstone.

EXAMPLE 1

A stirred vessel is charged with 348 parts of crude pigment (Pigment Blue 80) and 52 parts of pigment dispersant (IV) where m is 1 in 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20 to 50° C. for a residence time of 15 minutes.

To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.4 parts of pigment preparation. The pigment preparation is pin milled to obtain a highly crystalline powder which, on testing in AM varnish, provides very clean coatings which are strong in color. The rheology of the paint is rated 5.

EXAMPLE 2

A stirred vessel is charged with 348 parts of crude pigment (Pigment Blue 80), 52 parts of pigment dispersant (IV) where m is 1 and 270 parts of 10% NaOH in altogether 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20 to 50° C. for a residence time of 15 minutes. To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.4 parts of pigment preparation. The pigment preparation is pin milled to obtain a highly crystalline powder which, on testing in HSS varnish, provides very clean coatings which are strong in color and have a transparent masstone. The rheology of the paint is rated 4.

EXAMPLE 3

A stirred vessel is charged with 348 parts of crude pigment (Pigment Blue 80), 52 parts of pigment dispersant (IV) where m is 1, 20 parts of a commercially available modified polyacrylate and 300 parts of 10% NaOH in altogether 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20 to 50° C. for a residence time of 15 minutes.

To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.6 parts of pigment preparation. The pigment preparation is pin milled to obtain a highly crystalline powder which, on testing in HSS varnish, provides very clean coatings which are strong in color and have a transparent masstone. The rheology of the paint is rated 4.

EXAMPLE 4

A stirred vessel is charged with 348 parts of crude pigment (Pigment Blue 80), 52 parts of pigment dispersant (IV) where m is 1, 36 parts of a commercially available polyacrylate block polymer and 330 parts of 10% NaOH in altogether 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20 to 50° C. for a residence time of 15 minutes. To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.2 parts of pigment preparation. The pigment preparation is pin milled to obtain a highly crystalline powder which, on testing in HSS varnish, provides very clean coatings which are strong in color and have a transparent masstone. The rheology of the paint is rated 4. The particle size distribution of the primary particles was found to have the following characteristic variables:

$d_{25}$=44 nm, $d_{50}$=56 nm, $d_{75}$=70 nm, $d_{95}$=101 nm. Length to width ratio: 1.69:1

EXAMPLE 5

A stirred vessel is charged with 352 parts of crude pigment (Pigment Blue 80), 46 parts of pigment dispersant (IV) where m is 1, 32 parts of a commercially available polyacrylate, 12 parts of a commercially available modified polydimethylsiloxane and 268 parts of 10% NaOH in altogether 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3-0.4 mm in diameter as grinding media, at a stirrer tip speed of 11.8 m/s and a specific power density of 2.0 kW per liter of mill space, at 20 to 50° C. for a residence time of 15 minutes.

To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.4 parts of pigment preparation. The pigment preparation is pin milled to obtain a highly crystalline powder which, on testing in WBC varnish, provides very clean coatings which are strong in color and have a transparent masstone. The rheology of the paint is rated 4.

EXAMPLE 6

A stirred vessel is charged with 354 parts of crude pigment (Pigment Blue 80), 46 parts of pigment dispersant (IV) where m is 1, 32 parts of a commercially available polyacrylate, 12 parts of a commercially available modified polydimethylsiloxane and 70 parts of 10% NaOH in 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3-0.4 mm in diameter as grinding media, at a stirrer tip speed of 11.8 m/s and a specific power density of 2.0 kW per liter of mill space, at 20 to 50° C. for a residence time of 15 minutes.

To 200 parts of the mill suspension is added 0.9 part of a condensation product based on cyanuric chloride, taurine, N,N'-diethylaminopropylamine and p-phenylenediamine and 143 parts of isobutanol. After several hours of stirring at boiling temperature, the alcohol is removed by steam distillation, adjusted to pH4 with formic acid, the suspension is filtered with suction, and the presscake is washed and dried at 80° C. to give 18.3 parts of pigment preparation. The pigment preparation is pin milled to obtain a highly crystalline powder which, on testing in WBC varnish, provides very clean coatings which are strong in color and have a transparent masstone. The rheology of the paint is rated 3.

The particle size distribution of the primary particles was found to have the following characteristic variables:

$d_{25}$=42 nm, $d_{50}$=53 nm, $d_{75}$=67 nm, $d_{95}$=88 nm. Length to width ratio: 1.65:1

EXAMPLE 7

27 parts of coarsely crystalline crude pigment (Pigment Blue 80) are introduced into a cylindrical 1 liter plastics vessel filled with 16 g of anhydrous sodium chloride and 1400 parts of Cylpebs (made of corundum, 12 mm in diameter, manufacturer: Groβ GmbH, Hof) as grinding media. The mixture is then finely ground by shaking a swing mill (model Vibratom® manufacturer: Siebtechnik Mühlheim) at 1400 revolutions per minute, swing circle 4 mm for 8 hours. Thereafter, the millbase is sieved clear of the grinding media to obtain 39 parts of millbase.

To 35 parts of the millbase are added 350 parts of isobutanol and 2.1 parts of pigment dispersant (IV) where m is 1. After several hours of stirring at boiling temperature, the alcohol is removed by steam distillation, the suspension is filtered with suction, and the presscake is washed and dried at 80° C. to obtain 22.7 parts of pigment preparation. The pigment preparation is pin milled to obtain an effectively crystalline powder which on testing in AM varnish provides coatings of moderate color strength. The rheology of the paint is rated 5.

EXAMPLE 8

27 parts of coarsely crystalline crude pigment (Pigment Blue 80) and 3 parts of pigment dispersant (IV) where m is 1 are introduced into a cylindrical 1 liter plastics vessel filled with 1400 parts of Cylpebs (made of corundum, 12 mm in diameter, manufacturer: Groβ GmbH, Hof) as grinding media. The mixture is then finely ground by shaking a swing mill (model Vibratom® manufacturer: Siebtechnik Mühlheim) at 1400 revolutions per minute, swing circle 4 mm for 8 hours. Thereafter, the millbase is sieved clear of the grinding media to obtain 29 parts of millbase.

To 40.5 parts of the millbase are added 350 parts of isobutanol. After several hours of stirring at boiling temperature, the alcohol is removed by steam distillation, the suspension is filtered with suction, and the presscake is washed and dried at 80° C. to obtain 27.4 parts of pigment preparation. The pigment preparation is pin milled to obtain an effectively crystalline powder which on testing in AM varnish provides coatings of high color strength. The rheology of the paint is rated 5.

The particle size distribution of the primary particles was found to have the following characteristic variables:

$d_{25}$=19 nm, $d_{50}$=24 nm, $d_{75}$=31 nm, $d_{95}$=43 nm. Length to width ratio: 1.63:1

EXAMPLE 9

A plastics vessel filled with 17 670 parts of stainless steel balls 10 mm in diameter as grinding media to 55% by volume is filled with 210 parts of crude pigment and 1050 g of anhydrous sodium sulfate. This is followed by 48 hours of grinding at 75% of the critical rotary speed on a roller table. Then, the millbase is sieved clear of the grinding media, slurried up in water, filtered off with suction, washed sulfate-free with water and dried at 80° C. to obtain 207.4 parts of millbase.

EXAMPLE 10

To 54 parts of millbase of example 9 are added 200 parts of isobutanol and also 2 parts of pigment dispersant (IV) where m is 1. After several hours of stirring at boiling temperature, the alcohol is removed by steam distillation, the suspension is filtered with suction, and the presscake is washed and dried at 80° C. to obtain 21.2 parts of pigment preparation. The pigment preparation is pin milled to obtain a highly crystalline powder which on testing in AM varnish provides coatings high in color strength. The rheology of the paint is rated 5.

EXAMPLE 11

27 parts of coarsely crystalline crude pigment (Pigment Blue 80) and 3 parts of pigment dispersant (IV) where m is 1 are introduced into a cylindrical 1 liter plastics vessel filled with 1400 parts of Cylpebs (made of corundum, 12 mm in diameter, manufacturer: Groß GmbH, Hof) as grinding media. The mixture is then finely ground by shaking a swing mill (model Vibratom® manufacturer: Siebtechnik Mühlheim) at 1400 revolutions per minute, swing circle 4 mm for 8 hours. Thereafter, the millbase is sieved clear of the grinding media to obtain 29 parts of millbase.

A stirred vessel is charged with 400 parts of the swing-milled prepigment, 36 parts of a commercially available polyacrylate block polymer and 330 parts of 10% NaOH in altogether 4 liters of water. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20 to 50° C. for a residence time of 15 minutes.

To 200 parts of the mill suspension are added 143 parts of isobutanol. After several hours of stirring at boiling temperature, the alcohol is removed by steam distillation, the suspension is filtered with suction, and the presscake is washed and dried at 80° C. to give 17.2 parts of pigment preparation. The pigment preparation is pin milled to obtain a highly crystalline powder which, on testing in HSS varnish, provides very clean coatings which are strong in color and have a transparent masstone. The rheology of the paint is rated 5.

The particle size distribution of the primary particles was found to have the following characteristic variables:

$d_{25}$=23 nm, $d_{50}$=27 nm, $d_{75}$=33 nm, $d_{95}$=47 nm. Length to width ratio: 2.14:1

EXAMPLE 12

450 parts of sodium chloride, 75 parts of coarsely crystalline crude pigment (Pigment Blue 80), 8.3 parts of pigment dispersant (IV) where m is 1 and 110 ml of diethylene glycol are kneaded at 80° C. for 8 hours. The kneaded material is stirred in 2500 parts of 5% aqueous hydrochloric acid at 40° C. for 2 hours, the suspension is filtered with suction, and the presscake is washed salt-free and dried to obtain 82.3 parts of pigment preparation.

The rheology of the paint is rated 4-5.

The particle size distribution of the primary particles was found to have the following characteristic variables:

$d_{25}$=44 nm, $d_{50}$=56 nm, $d_{75}$=69 nm, $d_{95}$=93 nm. Length to width ratio: 1.78:1

EXAMPLE 13

A stirred vessel is charged with 348 parts of crude pigment (Pigment Blue 80), 52 parts of pigment dispersant (IV) where m is 1 and 338 parts of 10% NaOH in 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20° C. for a residence time of 20 minutes.

To 276 parts of the mill suspension are added 253 parts of isobutanol. After several hours of stirring at boiling temperature, the alcohol is removed by steam distillation, the suspension is filtered with suction, and the presscake is washed and dried at 80° C. to give 25.8 parts of pigment preparation. The pigment preparation is pin milled to obtain a highly crystalline powder which, on testing in AM varnish, provides very clean coatings which are strong in color. The rheology of the paint is rated 3-4.

The particle size distribution of the primary particles was found to have the following characteristic variables:

$d_{25}$=48 nm, $d_{50}$=71 nm, $d_{75}$=109 nm, $d_{95}$=158 nm. Length to width ratio: 1.58:1

EXAMPLE 14

A stirred vessel is charged with 280 parts of crude pigment (Pigment Blue 80), 120 parts of pigment dispersant (IV) where m is 1 and 666 parts of 10% NaOH in 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 20° C. for a residence time of 20 minutes.

To 254 parts of the mill suspension are added 209 parts of isobutanol. After several hours of stirring at boiling temperature, the alcohol is removed by steam distillation, the suspension is filtered with suction, and the presscake is washed and dried at 80° C. to give 19.7 parts of pigment preparation. The pigment preparation is pin milled to obtain a highly crystalline powder which, on testing in AM varnish, provides very clean coatings which are strong in color. The rheology of the paint is rated 4.

The particle size distribution of the primary particles was found to have the following characteristic variables:

$d_{25}$=26 nm, $d_{50}$=32 nm, $d_{75}$=42 nm, $d_{95}$=58 nm. Length to width ratio: 1.93:1

EXAMPLE 15

A stirred vessel is charged with 348 parts of crude pigment (Pigment Blue 80), 52 parts of pigment dispersant (IV) where m is 1 and 381 parts of 10% NaOH in 4 liters of water as initial charge. This suspension is ground in a Drais DCP SF 12 stirred ball mill (manufacturer: Draiswerke GmbH, Mannheim), filled with 2200 parts of zirconium mixed oxide beads 0.3 to 0.4 mm in diameter as grinding media, at a stirrer tip speed of 11.8 m/s and a specific power density of 2.0 kW per liter of mill space, at 65° C. for a residence time of 20 minutes.

To 244 parts of the mill suspension are added 207 parts of isobutanol. After several hours of stirring at boiling temperature, the alcohol is removed by steam distillation, the suspension is filtered with suction, and the presscake is washed and dried at 80° C. to give 22.8 parts of pigment preparation. The pigment preparation is pin milled to obtain a highly crystalline powder which, on testing in AM varnish, provides very clean coatings which are strong in color. The rheology of the paint is rated 3-4.

The particle size distribution of the primary particles was found to have the following characteristic variables:

$d_{25}=35$ nm, $d_{50}=46$ nm, $d_{75}=60$ nm, $d_{95}=103$ nm. Length to width ratio: 1.83:1

What is claimed is:

1. A pigment preparation comprising
   a) a benzimidazolonedioxazine compound of formula (I) as base pigment

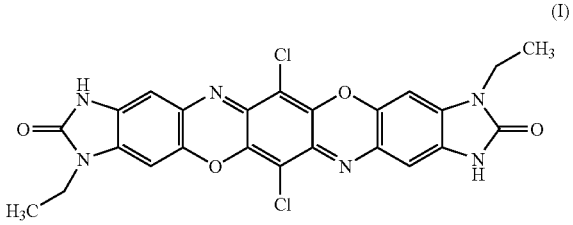

and
   b) a dioxazine compound of the formula (IV) as pigment dispersant

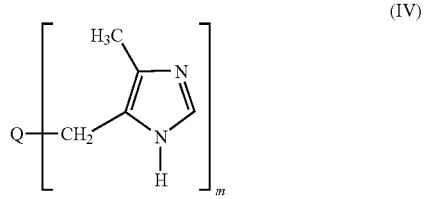

wherein

Q is an m-valent radical of a compound of formula (III),

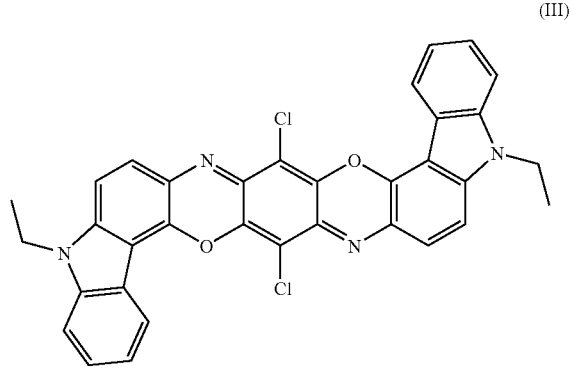

m is a number from 1 to 4.

2. A pigment preparation as claimed in claim 1, wherein m is a number from 1 to 2.

3. A pigment preparation as claimed in claim 1, containing 0.5% to 99% by weight of pigment dispersant of formula (IV), based on the weight of the base pigment of formula (I).

4. A pigment preparation as claimed in claim 1, containing 2.5% to 50% by weight of pigment dispersant of formula (IV), based on the weight of the base pigment of formula (I).

5. A pigment preparation as claimed in claim 1, wherein the pigment preparation has a $d_{95}$ less than 200 nm, a $d_{50}$ less than 100 nm and a $d_{25}$ less than 80 nm.

6. A pigment preparation as claimed in claim 1, wherein the pigment preparation has a $d_{95}$ less than 100 nm, a $d_{50}$ less than 50 nm, and a $d_{25}$ less than 45 nm.

7. A pigment preparation as claimed in claim 1, further comprising auxiliaries or adjuncts selected from the group consisting of surfactants, pigmentary and nonpigmentary dispersants, fillers, standardizers, resins, waxes, defoamers, antidusters, extenders, antistats, shading colorants, preservatives, drying retarders, rheology control additives, wetting agents, antioxidants, biocides, UV-absorbers and photostabilizers.

8. A pigment preparation as claimed in claim 7, wherein the auxiliaries or adjuncts are present in an amount of 0.1% to 60% by weight, based on the total weight of the pigment preparation.

9. A process for manufacturing a pigment preparation as claimed in claim 1, comprising the step of mixing the pigment dispersant of formula (IV) and the benzimidazolonedioxazine compound of formula (I) with each other or being allowed to act on each other at any stage of their manufacturing operation.

10. A pigmented article pigmented by a pigment preparation according to claim 1, wherein the pigmented article is selected from the group consisting of macromolecular organic materials, color filters, electrophotographic toners, electrophotographic developers and e-inks.

11. The pigmented article as claimed in claim 10, wherein the macromolecular organic material is a plastic, coating, paint or liquid ink.

12. A metallic paint system pigmented with a pigment preparation as claimed in claim 1.

13. A macromolecular organic material comprising a coloristically effective amount of a pigment preparation as claimed claim 1.

14. A color filter comprising a coloristically effective amount of a pigment preparation as claimed in claim 1.

* * * * *